Patented Feb. 23, 1943

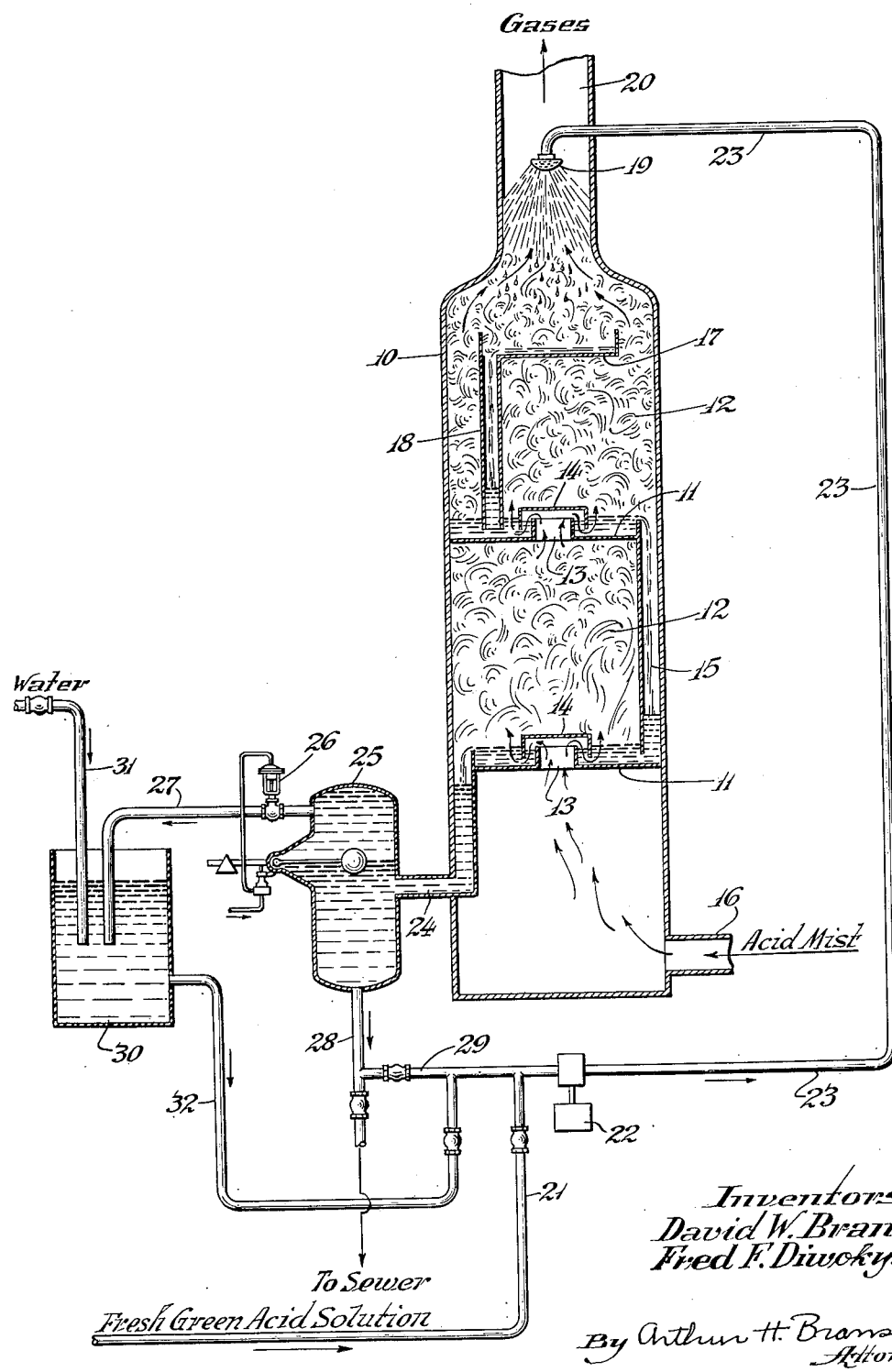

2,311,625

UNITED STATES PATENT OFFICE 2,311,625

GAS PURIFICATION

David W. Bransky and Fred F. Diwoky, Chicago, Ill., assignors to Standard Oil Company, Chicago, Ill., a corporation of Indiana Application December 21, 1939, Serial No. 310,278

10 Claims. (Cl. 23—2)

This invention relates to improvements in the method of and apparatus for removing one or more sulfur-containing acidic components from gaseous mixtures containing the same and more particularly to the removal of sulfur dioxide and/or sulfur trioxide and/or sulfuric acid mist from gaseous mixtures containing the same.

The process of the present invention comprises contacting the sulfur-containing acidic gases with a selective reagent possessing the ability to form small stable bubbles which provide increased contacting surfaces for the adsorption of the sulfur-containing acidic gaseous components of the gas being treated. The selective reagent is one which on contacting with gases is capable of forming a stable froth or foam at practical throughputs of acidic gaseous mixtures to cause the adsorption of the acidic components therefrom. The reagents which we have found most suitable for this purpose are water-soluble sulfonic acids and especially the water-soluble sulfonic acids obtained from acid sludges resulting from the acid treatment of petroleum oils. We prefer to use the water-soluble sulfonic acids commonly referred to in the art of refining petroleum as green acids. The green acids may be obtained by the hydrolysis of water-soluble acid sludges resulting from the acid treatment of technical and medicinal white oils or by the decomposition of the soaps of such acids. Our invention also contemplates the use of water soluble sludges resulting from the sulfuric acid treatment of petroleum oils.

Other reagents which we have found suitable are compounds such as Tergitol Penetrant 08, a synthetic primary alcohol sulfate, and Neomerpin-N which is naphthalene sulfonic acid.

In general, the most economical and available source of sulfonic acids used in our process is the sulfuric acid sludge obtained in the sulfuric acid treatment of petroleum oils. Certain highly refined petroleum products such as highly refined lubricating oils, transformer oils, turbine oils, technical white oils, medicinal white oils and similar petroleum products are produced by the treatment of a petroleum dstillate with fuming sulfuric acid. The concentration of fuming acid employed may vary from a few percent of uncombined $SO_3$ up to pure sulfuric anhydride. The amount of fuming sulfuric acid applied to the petroleum distillate may vary for any individual batch from about 3% up to about 50% by volume of the original quantity of oil treated. After agitating the petroleum distillate and acid together the mixture is permitted to settle whereupon a heavy greenish to black colored sludge separates as a lower layer. This sludge contains unconsumed sulfuric acid, together with certain organic acids resulting from the reaction of the fuming sulfuric acid with the oil. Depending upon the oil treated, the mode of treatment, and the number of times the oil has been previously treated, the organic acids may compose from about 25% to about 75% of total sludge. The sludge organic acids although substantially oil-insoluble are readily soluble in water. The acids in aqueous solution are dark green in color and for this reason are generally referred to as "green acids." In addition to being obtained from acid sludges resulting from the treatment of petroleum distillates with fuming sulfuric acid these green acids may also be produced by the action of strong sulfuric acid, for example by the action of an acid having a sulfuric acid content of about 98% to 100%, on certain types of lubricating oil distillates. The separation of the green acids from acid sludge may be accomplished by the hydrolysis of such sludges and by other means well known to those versed in the petroleum refining art, such as for example, the methods described in the Humphrey's et al. U. S. Patent 1,474,933, the Ramayya U. S. Patents 1,935,666 and 1,965,992, the method of Divine described in U. S. 1,438,101 and other methods.

The present invention finds particular application in the removal of sulfuric acid mist and/or sulfur dioxide from fumes expelled in the concentration of sulfuric acid. In the concentration of sulfuric acid hot gases are admitted to the acid concentrators below the surface of the acid where they give up their heat and evaporate water from the acid. The gases then pass from the acid concentrators through a mist precipitating device, such as a Cottrell precipitator, and out into the atmosphere. Although the mist precipitators are effective in removing a portion of the sulfuric acid mist their efficiency decreases as the dilution of the sulfuric acid mist in the effluent gases increases. The emission of sulfuric acid mist or $SO_3$ fog and $SO_2$ vapor from sulfuric acid concentrating plants has always been a source of nuisance and causes physical discomfort as well as damage to property surrounding such plants. The sulfuric acid mist or $SO_3$ fog is especially objectionable since the fog or mist is difficult to disperse and is carried close to the ground for relatively great distances. Many remedies have been suggested to correct this nuisance such as high stacks, burning the gases, various filtering media, and steam or water ejectors but prior to applicants' invention none of these suggested remedies have been satisfactory.

We have discovered that the effluent gases from acid concentrating plants containing sulfuric acid mists or $SO_3$ fog together with $SO_2$ can be substantially freed of these objectionable acidic components by contacting the gases leaving the acid concentrators with a solution of water-soluble sulfonic acids such as green acids.

The concentration of the green acid in the scrubbing medium may vary from 0.005% to 50% although it is preferred to employ lower concentrations, preferably concentrations varying from about 0.05% to about 10%. The adsorption may be conducted at temperatures ranging from about 32° F., to about 200° F. and preferably at temperatures ranging from about 80° F. to about 200° F.

In scrubbing the effluent gases from the acid concentrators with green acid solution the gases are passed through a suitable tower and bubbled through one or more pools of the green acid solution. As the gases and green acid solution contact each other great numbers of small bubbles are formed in and above the green acid solution producing a stable foam or froth above the solution. The property of the green acid solution to form the small stable bubbles makes this material especially suitable for this purpose. However, in addition to having the property of forming the stable froth or foam the green acids also possess the property of absorbing sulfuric acid.

The adsorption of sulfuric acid mist by the green acid solution foam is best carried out in towers provided with suitable bubble trays and foam destroying devices. A sectional elevation of a preferred apparatus for carrying out the present invention is shown in the accompanying drawing which forms a part of this specification.

Referring to the drawing, a column 10 is provided with a plurality of spaced bubble trays 11 dividing the column into a plurality of superimposed zones 12. Each of the bubble trays 11 is provided with a suitable vapor riser 13 and a bubble cap 14 for maintaining a pool of liquid thereon. Each of the bubble trays 11, except the lowermost tray, is also provided with a downcomer 15 extending into the liquid on the next lower bubble tray. The column 10 is provided in the lower portion thereof below the lowermost bubble tray with a gas inlet 16 and in the upper portion above the uppermost tray with a collecting tray 17 provided with downcomer 18, a spraying device 19 and a gas out 20. While we have shown only one vapor riser and one bubble cap on each of the trays it is understood that each of the trays may be provided with a plurality of vapor risers and bubble caps.

Referring further to the drawing, the preferred method for carrying out the present invention is as follows: effluent gases from the acid concentrators (not shown) enter the gas inlet 16 and bubble upward through the liquid on each of the bubble trays 11 through bubble caps 14. Green acid solution from a suitable source and of a suitable concentration is introduced into the system through a valved line 21 and is forced by means of a pump 22 and a line 23 through the spray head 19 in the top column 10. Ascending effluent gases bubbling through the green acid solution on each of the trays produces a froth or foam in each zone 12. As the froth or foam from any lower zone 11 passes through the bubble caps 14 on the next higher tray 11, the foam is broken and reformed. As the froth or foam enters the upper portion of the uppermost zone 12 it comes in contact with the descending spray of green acid solution introduced into this top zone through lines 21 and 23 and the spraying device 19, and is thereby destroyed or broken. The descending liquid is caught by the collecting tray 17 and passes through downcomer 18 to the upper bubble tray 11, thence through downcomer 15 to the next lower trays 11 and thence through a suitable drawoff line 24 to a settling chamber 25. The gases now freed of undesired sulfuric acid mist or $SO_3$ fog and/or sulfur dioxide pass to the atmosphere through gas outlet 20. Other means may be provided for breaking the foam or froth, such as introducing a stream of air or an inert gas into the uppermost zone 12.

In order to support the foam or froth structure in the zones 12 a series of guide vanes may be inserted in each zone paralleling the flow of gas. Such vanes may be in the form of vertical baffles or in the form of circular tubing honeycombing the zone. In order to minimize the reduction of the cross sectional area of the zones and the resulting increase of back pressure the vanes should be constructed of light gage material.

When the concentration of sulfuric acid in the green acid solution approaches a value of about 10% to about 12%, the green acids become relatively insoluble in the aqueous phase. This causes the efficiency of bubble formation to decrease and hence causes a decrease in the adsorption efficiency of the system. To avoid this the green acid liquor containing sulfuric acid is removed, either continuously or intermittently as the concentration of the sulfuric acid in the aqueous solution of green acids increases, from the tower 10 through line 24 to a separator 25 wherein green acid is separated from the aqueous sulfuric acid solution. The separator 25 may be provided with an automatic overflow valve 26 for facilitating the removal of green acid from the upper portion of the separator through a line 27. The aqueous green acid and sulfuric acid solution is withdrawn from the lower portion of the separator 25 through a line 28 from whence it may pass to the sewer, or a portion thereof passed through a valve line 29 to be recycled or combined with the fresh green acid solution entering the system through the line 21 for recirculation through pump 22 and line 23 to spray 19. The separated green acid overflow passes through line 27 to make up tank 30 where it is mixed with water introduced through a valved line 31, whence it may be recycled through valved line 32 to valved line 29 for recirculation by pump 22 through line 23 to spray 18.

Although an adsorption column with a plurality of contacting or bubble trays has been shown as the preferred embodiment, effective removal of sulfuric acid mist or $SO_3$ fog can be obtained in an adsorption column containing a single contact or bubble tray. In a tower provided with a single bubble tray from 80 to 93% of sulfuric acid mist was removed from the effluent gases from sulfuric acid concentrators, and in the same tower provided with two bubble trays from 96% to 98% sulfuric acid mist removal was effected.

When using green acid solution as the absorption medium it has been found essential to avoid the presence of substantial amounts of iron salts in the green acid solution. It has been found that the ability of the green acid solution to form a stable foam or froth is materially affected by the presence of iron salts in the absorption medium. Tests have indicated that when the iron concentration of the green acid reaches a figure in excess of about 0.05% the effectiveness thereof is materially decreased. It is therefore desirable to avoid the exposure of iron surfaces in the adsorption system. Preferably the system should be lined with a suitable material such as lead or the exposed surfaces should be painted with a suitable paint, such as an asphalt paint, to eliminate as much corrosion as possible.

The effectiveness of the process of the present invention in removing sulphuric acid mist or $SO_3$ fog from the effluent gases regardless of the concentration of the acid mist in such gases is demonstrated by the data shown in Table I.

*Table I*

| Tests | Mist—milligram $H_2SO_4$ | | Removal | Green acid concentration | Contact time | Gas velocity |
|---|---|---|---|---|---|---|
| | Entrance gas | Exit gas | | | | |
| | Per cubic foot | Per cubic foot | Per cent | Per cent | Seconds | Feet per second |
| 1 | 845.0 | 76 | 91.1 | 2 | 12.5 | 0.0736 |
| 2 | 93.6 | 1.8 | 98.1 | 2 | 14.1 | 0.0651 |
| 3 | 8.1 | 0.25 | 97.0 | 2 | 13.6 | 0.0673 |

In Table I test numbers 1, 2 and 3 show the effective removal of acid mist from effluent gases containing respectively 845, 93.6 and 8.1 milligrams of $H_2SO_4$ per cubic foot. In these tests the time of contact and the gas velocity were substantially constant.

The effect of the time of contact on the removal of acid mist particles is shown by the data in Table II.

*Table II*

| Milligrams $H_2SO_4$ per cu. ft. in entrance gas | Contact time | Removal |
|---|---|---|
| | Seconds | Per cent |
| 63 | 2 | 30 |
| 20 | 3 | 44 |
| 86 | 3 | 48 |
| 63 | 4 | 58 |
| 81 | 5 | 80 |
| 64 | 7 | 88 |
| 50 | 8 | 89 |
| 79 | 10 | 93 |
| 57 | 11 | 94 |
| 83 | 12 | 96 |
| 86 | 13 | 96 |
| 94 | 14 | 98 |
| 49 | 26 | 98 |

With the bubble size here employed the above data indicate that to obtain at least 90% removal of the mist a time of contact of at least ten seconds is required. At shorter times of contact the removal drops off rapidly, but at longer times of contact the increased efficiency is not marked.

It should be understood that the present invention is not limited to the specific disclosures of the preferred methods of an apparatus for carrying out the same, but that the invention includes all modifications and variations coming within the scope of the appended claims.

We claim:

1. The method of removing sulfuric acid mist and sulfur oxides from a gaseous mixture containing the same comprising contacting said gaseous mixture with a froth of a water-soluble sulfonic acid solution.

2. The method of removing sulfuric acid mist and sulfur oxides from a gaseous mixture containing the same comprising passing the gaseous mixture through a pool of an aqueous solution of a water-soluble sulfonic acid to form a stable froth thereof, contacting the gaseous mixture leaving the pool of said aqueous solution of a water-soluble sulfonic acid with said froth, whereby the sulfuric acid mist and sulfur oxides in said gaseous mixture are preferentially absorbed, breaking the froth of said aqueous solution of a water-soluble sulfonic acid having absorbed therein the undesirable sulfuric acid mist and sulfur oxides and removing the gaseous mixture substantially free of said sulfuric acid mist and sulfur oxides.

3. The method of removing sulfuric acid mist and sulfur oxides from a gaseous mixture containing the same comprising passing the gaseous mixture through a pool of an aqueous solution of a water-soluble sulfonic acid to form a stable froth thereof, contacting the gaseous mixture leaving the pool of said aqueous solution of a water-soluble sulfonic acid with a froth whereby the sulfuric acid mist and sulfur oxides in said gaseous mixture are preferentially absorbed, breaking the froth of said aqueous solution of a water-soluble sulfonic acid having absorbed therein the undesirable sulfuric acid mist and sulfur oxides, recycling the broken froth solution to the pool of said aqueous solution of a water-soluble sulfonic acid and removing the gaseous mixture substantially free of said sulfuric acid mist and sulfur oxides.

4. A method of removing sulfuric acid mist and sulfur oxides from a gaseous mixture containing the same comprising bubbling the gaseous mixture through a pool of an aqueous solution of a water-soluble sulfonic acid whereby a stable froth is produced, contacting the gaseous mixture leaving the pool of said aqueous solution of a water-soluble sulfonic acid with said froth, breaking said froth by contacting the same with a descending spray of an aqueous solution of a water-soluble sulfonic acid and removing the gaseous mixture substantially free of the sulfuric acid mist and the sulfur oxides.

5. The method of removing a sulfuric acid mist and sulfur oxides from a gaseous mixture containing the same as described in claim 4 in which the water-soluble sulfonic acid is green acid obtained from the sludge resulting from the sulfuric acid treatment of petroleum oils.

6. The method of removing sulfuric acid mist and sulfur oxides from a gaseous mixture containing the same as described in claim 4 wherein the water-soluble sulfonic acid is a water-soluble sludge resulting from the sulfuric acid treatment of petroleum oils.

7. The method of removing sulfuric acid mist from the effluent gases from sulfuric acid concentrators comprising bubbling the effluent gases through a pool of green acid solution, forming a stable froth of green acid solution, contacting the effluent gases leaving the pool of green acid solution with said froth, breaking the froth with a descending stream of green acid solution, removing the effluent gases substantially free of sulfuric acid mist, periodically removing a portion of the green acid solution containing sulfuric acid removed from the effluent gases and subsequently removing the green acid from the sulfuric acid solution.

8. The method of removing sulfuric acid mist from the effluent gases from the sulfuric acid concentrators as described in claim 7 in which the green acid solution has a green acid concentration from about 0.005% to about 50% and in which the green acid solution is maintained at a temperature from about 32° F. to about 200° F.

9. The method of removing sulfuric acid mist from the effluent gases from the sulfuric acid concentrators as described in claim 7 in which the green acid solution has a green acid concentration from about 0.05% to about 10% and in which the green acid solution is maintained at a temperature from about 80° F. to about 200° F.

10. The method of removing sulfuric acid mist from the effluent gases from sulfuric acid concentrators as described in claim 7 in which the sulfuric acid concentration in the green acid solution is maintained at a concentration not greater than about 12%.

DAVID W. BRANSKY.
FRED F. DIWOKY.